(12) United States Patent
Barnett et al.

(10) Patent No.: US 6,925,633 B1
(45) Date of Patent: Aug. 2, 2005

(54) METHOD AND APPARATUS FOR AUTOMATING TESTING OF JAVA BEANS

(75) Inventors: Gary Barnett, San Jose, CA (US); Vaishali Ghanwat, Milpitas, CA (US)

(73) Assignee: Aspect Communications Corporation, San Jose, CA (US)

( * ) Notice: Subject to any disclaimer, the term of this patent is extended or adjusted under 35 U.S.C. 154(b) by 811 days.

(21) Appl. No.: 09/583,311

(22) Filed: May 30, 2000

(51) Int. Cl.[7] .............................................. G06F 9/44
(52) U.S. Cl. ...................................................... 717/124
(58) Field of Search ................................ 717/124–135; 714/38, 40; 702/122, 186; 703/13; 379/9

(56) References Cited

U.S. PATENT DOCUMENTS

| | | | | |
|---|---|---|---|---|
| 5,758,061 A | * | 5/1998 | Plum ............................ | 714/35 |
| 5,784,553 A | * | 7/1998 | Kolawa et al. ................ | 714/38 |
| 6,058,493 A | * | 5/2000 | Talley .......................... | 714/38 |
| 6,192,108 B1 | * | 2/2001 | Mumford et al. ............... | 379/9 |
| 6,205,412 B1 | * | 3/2001 | Barskiy et al. ................ | 703/13 |
| 6,292,909 B1 | * | 9/2001 | Hare ............................ | 714/40 |
| 6,427,000 B1 | * | 7/2002 | Mumford et al. ............... | 379/9 |
| 6,434,502 B1 | * | 8/2002 | Harrison ...................... | 702/122 |
| 6,457,142 B1 | * | 9/2002 | Klemm et al. ................. | 714/38 |
| 6,473,894 B1 | * | 10/2002 | Shrader et al. .............. | 717/126 |
| 6,601,018 B1 | * | 7/2003 | Logan ......................... | 702/186 |

* cited by examiner

*Primary Examiner*—Anil Khatri
*Assistant Examiner*—Trent J Roche
(74) *Attorney, Agent, or Firm*—Schwegman, Lundberg, Woessner & Kluth, P.A.

(57) ABSTRACT

According to the invention, systems, and methods are disclosed for testing of a first program is provided. First, an input file containing a location of a first program, identifiers of other programs to be invoked by the first program, and arguments to be passed to the other programs is read. Next, the first program is executed including invoking the other programs and passing to those programs the arguments specified. Finally, log files are generated based on results of execution of the first program and the other programs.

30 Claims, 15 Drawing Sheets

```
# Descriptor should be one word
500 — # This file has path to a bean and it also
       # has all the APIs to be implemented 505 — BeanName = D:/Aspect/nortel/java/MLObject.jar
        MethodName = Method1
        Parameters = vghanwat-pc
        MethodName = Method2
        Parameters = int 9001
        MethodName = Method3
        Parameters = NONE
        MethodName = Method4
510     Parameters = NONE
        MethodName = Method5
        Parameters = NONE
        MethodName = Method6
        Parameters = short 8 string 4040 string 5146
        MethodName = Method7
        Parameters = short 8 string 4040
        MethodName = Method8
        Parameters = short 1

515 — loop 4
520 — sleep 5
      MethodName = Method9
      Parameters = short 8 string 5159 short 8 string 7007 short 0
525 — endloop sleep 5
      MethodName = Method10
      Parameters = short 8 string 4040
      # MethodName = Method11
      # Parameters = NONE
```

Figure 5

620              625
Thu Nov 11 12:41:33 PST 1999  Method1 returned null ⟵ 615
Thu Nov 11 12:41:33 PST 1999  Method2 returned null
Thu Nov 11 12:41:33 PST 1999  Method3 returned 0
Thu Nov 11 12:41:33 PST 1999  Method4 returned 0
Thu Nov 11 12:41:33 PST 1999  Method5 returned 701
Thu Nov 11 12:41:33 PST 1999  Method6 returned 0
Thu Nov 11 12:41:33 PST 1999  Method7 returned 0
Thu Nov 11 12:41:33 PST 1999  Method8 returned 0
Thu Nov 11 12:41:33 PST 1999  Method9 returned 0
Thu Nov 11 12:41:33 PST 1999  Method9 returned 0
Thu Nov 11 12:41:33 PST 1999  Method9 returned 0
Thu Nov 11 12:41:33 PST 1999  Method9 returned 0
Thu Nov 11 12:41:33 PST 1999  Method10 returned 0
Thu Nov 11 12:41:33 PST 1999  Method11 returned 0

715 — Thu Nov 11 12:41:33 PST 1999 **Start of Method1 Response ***
Thu Nov 11 12:41:33 PST 1999 Property1 is 1012
720 — Thu Nov 11 12:41:33 PST 1999 Property2 is 1
725 — Thu Nov 11 12:41:33 PST 1999 Property3 is 85
Thu Nov 11 12:41:33 PST 1999 ***End of Respone ***
Thu Nov 11 12:41:33 PST 1999 ***Start of Method2 Response ***
Thu Nov 11 12:41:33 PST 1999 Property1 is 0
Thu Nov 11 12:41:33 PST 1999 Property2 is 0
Thu Nov 11 12:41:33 PST 1999 Property3 is 1
Thu Nov 11 12:41:33 PST 1999 Property4 is 1
Thu Nov 11 12:41:33 PST 1999 Property5 is 1
Thu Nov 11 12:41:33 PST 1999 Property6 is 6
Thu Nov 11 12:41:33 PST 1999 Property7 is 520
Thu Nov 11 12:41:33 PST 1999 Property8 is 1
Thu Nov 11 12:41:33 PST 1999 Property9 is 8
Thu Nov 11 12:41:33 PST 1999 Property10 is 1
Thu Nov 11 12:41:33 PST 1999 Property11 is 0
Thu Nov 11 12:41:33 PST 1999 ***End of Response ***
Thu Nov 11 12:41:33 PST 1999 ***Start of Method3 Response***
Thu Nov 11 12:41:33 PST 1999 Property1 is 1
Thu Nov 11 12:41:33 PST 1999 Property2 is 7007
Thu Nov 11 12:41:33 PST 1999 Property3 is 13
Thu Nov 11 12:41:33 PST 1999 Property4 is 3
Thu Nov 11 12:41:33 PST 1999 Property5 is 4353
Thu Nov 11 12:41:33 PST 1999 Property6 1
Thu Nov 11 12:41:33 PST 1999 Property7 is 1165
Thu Nov 11 12:41:33 PST 1999 Property8 is 56
Thu Nov 11 12:41:33 PST 1999 Property9 is 1
Thu Nov 11 12:41:33 PST 1999 Property10 is 4040
Thu Nov 11 12:41:33 PST 1999 Property11 is 1
Thu Nov 11 12:41:33 PST 1999 Property12 is 0
Thu Nov 11 12:41:33 PST 1999 ***End of Response ***

METHOD AND APPARATUS FOR AUTOMATING TESTING OF JAVA BEANS

FIELD OF THE INVENTION

This invention relates to software testing in general, and more specifically to a tool for automating the testing of any given Java Bean.

BACKGROUND OF THE INVENTION

Object oriented programming languages such as Java are frequently used in a variety of applications. These applications include programs for use on personal computers as well as complex systems such as those used in Computer Telephony Integration (CTI) networks. In a CTI system, applications written using Java interface with a CTI server to interact with a switch or Automatic Call Distributor (ACD). Object oriented languages such as Java are popular for use in such applications because of their ease of maintenance and expandability. However, testing of new or revised software is a time consuming and therefore expensive process.

In order to test a new or revised program, a programmer is generally required to write a test script or test program which is specific to a particular switch. Such a script or program may include commands to test the functionality of a switch, and possibly provide means for outputting results of the test. The technique of writing a switch specific testing program is time consuming and therefore costly.

SUMMARY OF THE INVENTION

According to one aspect of the invention, a method and system for testing a first program is provided. First, an input file containing a location of a first program, identifiers of other programs to be invoked by the first program, and arguments to be passed to the other programs is read. Next, the first program is executed including invoking the other programs and passing the arguments to those programs. Finally, log files are generated based on results of execution of the first program and the other programs.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 5 is an example of an input file according to one embodiment of the present invention;

FIG. 6 is an example of a bean event log file according to one embodiment of the present invention;

FIG. 7 is an example of a script execution log file according to one embodiment of the present invention;

DETAILED DESCRIPTION

Figure 1:
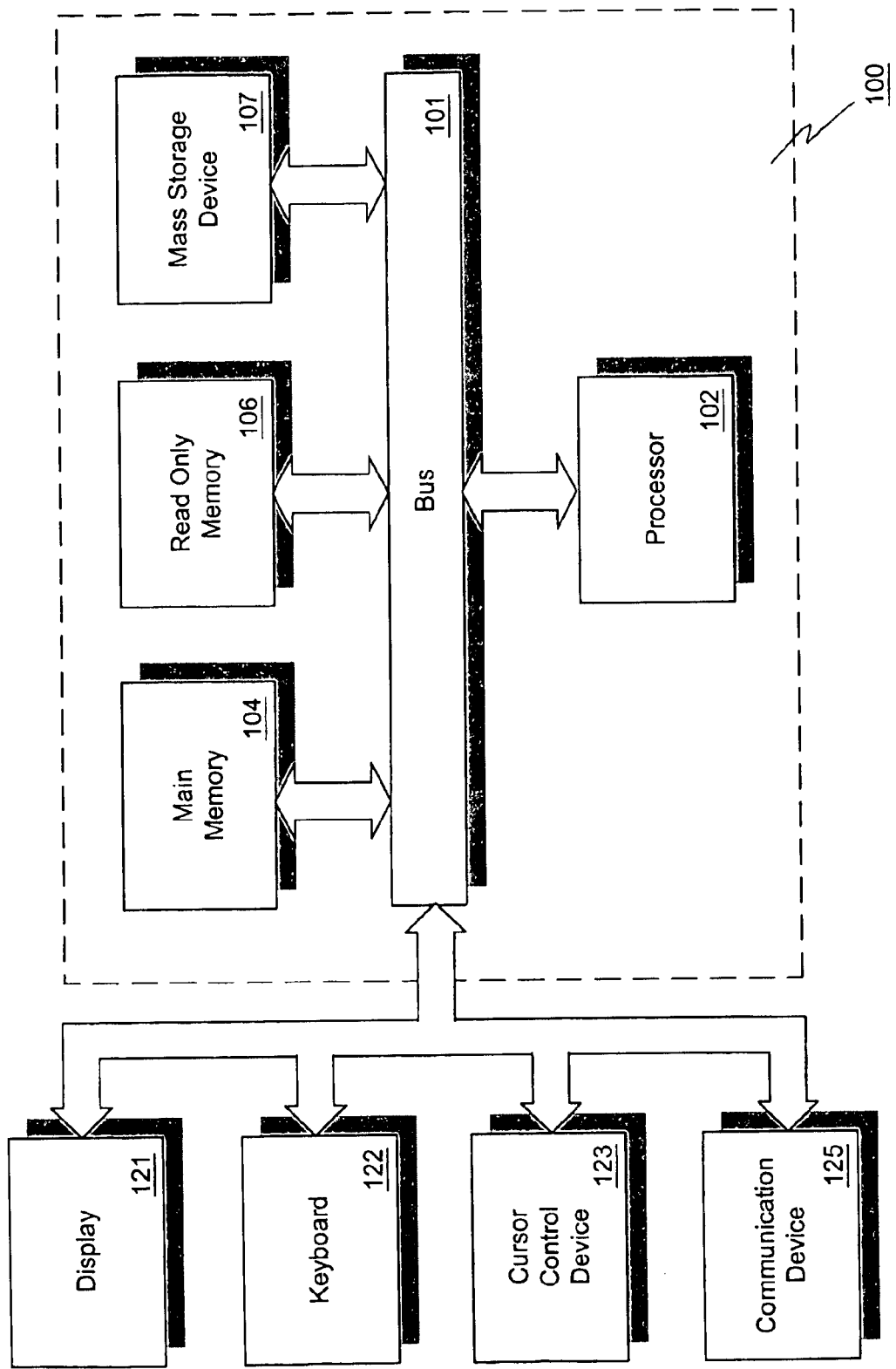
FIG. 1 is an example of a typical computer system upon which one embodiment of the present invention may be implemented.

According to one embodiment of the present invention, methods and systems for testing software are provided. These methods allow testing of a program without requiring an additional test program to be written. Further, no changes to the programming to be tested are required. According to one embodiment of the present invention, an automatic testing tool for generic Java Beans is provided. The tool tests any Java Bean given the path to this Bean and a list of APIs to be invoked.

According to one embodiment of the present invention, an input file containing a location of a first program, identifiers of other programs to be invoked by the first program, and arguments to be passed to the other programs is read. Next, the first program is executed including invoking the other programs and passing to those programs the arguments specified. Finally, log files are generated based on results of execution of the first program and the other programs.

According to one embodiment of the present invention, a Java Bean and a list of APIs and their parameters is read by the testing tool. Next, the Java Bean is located from the given path at runtime. If it does not exist at the given location an error is produced. The tool also checks to see if the given list of APIs exist in the Java Bean. If so, the given APIs are executed in the order they appear in the input file. The tool also recognizes some other keywords not existing in the Java Bean such as "sleep" and "loop".

According to another aspect of the present invention, special commands can be included in the input file. Generally, these commands can be used to control the flow of program execution. For example, execution of the program to be tested can be caused to repeat some code or to temporarily pause execution. Details of these commands and other aspects of the present invention will be described further below.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/ machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to automated testing of Java Beans interacting with a Computer-Telephony Integration (CTI) server, the method and apparatus described herein are equally applicable to automated testing of other types of software on different types of platforms.

For example, the techniques described herein are thought to be useful in connection with automating testing of other object oriented languages in systems such as personal computers. For example, similar techniques can be applied to automated testing of a DLL 110 or an ActiveX control.

FIG. 1 is an example of a typical computer system upon which one embodiment of the present invention may be implemented. Computer system 100 comprises a bus or other communication means 101 for communicating information, and a processing means such as processor 102 coupled with bus 101 for processing information. Computer system 100 further comprises a random access memory (RAM) or other dynamic storage device 104 (referred to as main memory), coupled to bus 01 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the operations described herein may be performed under the control of a programmed processor, such as processor 102, in alternative embodiments, the operations may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a particular embodiment wherein the recited operations are performed by a specific combination of hardware components.

Figure 2:
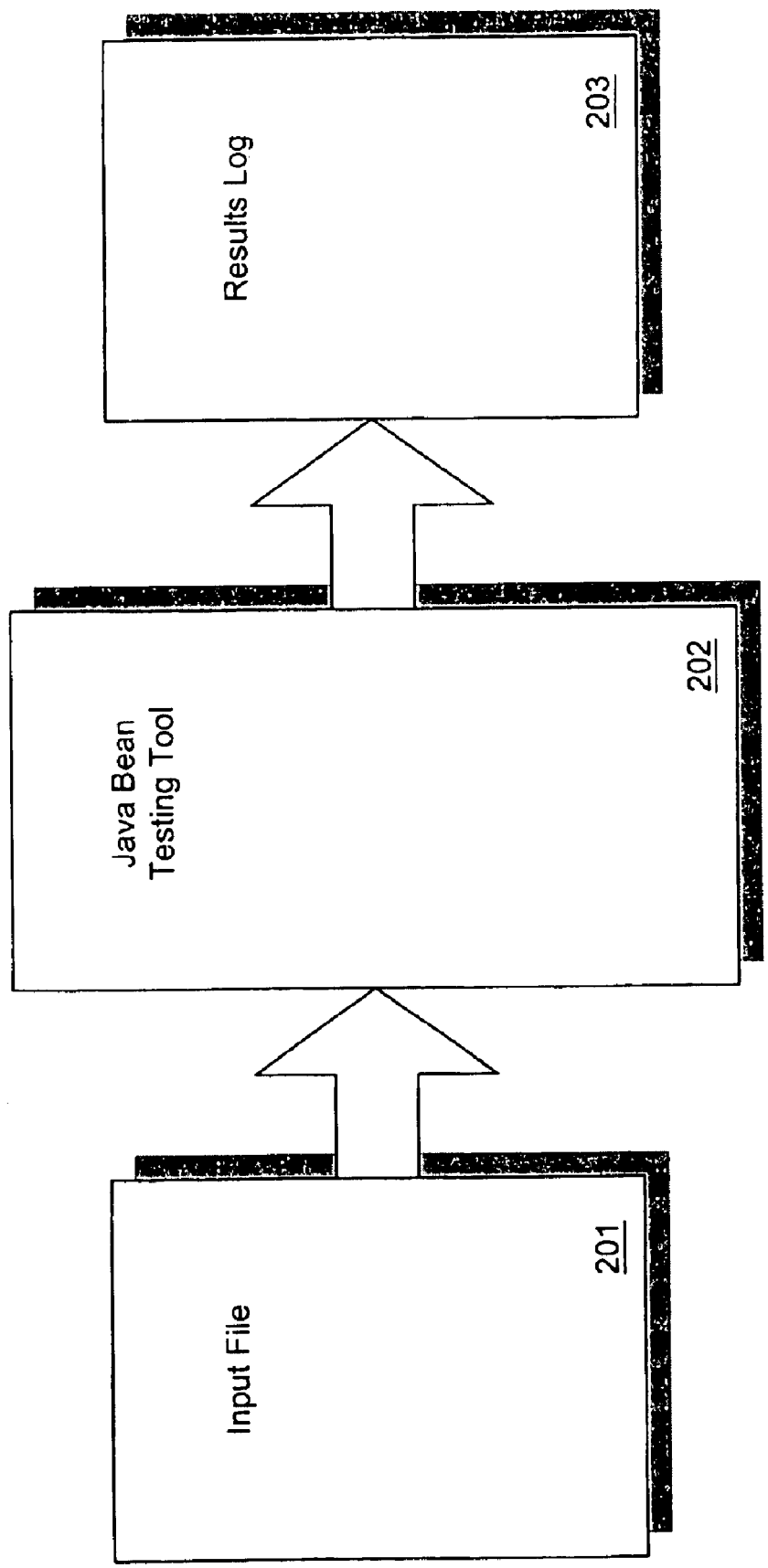
FIG. 2 is a block diagram illustrating a conceptual view of a Java Bean testing tool for a computer system according to one embodiment of the present invention.

FIG. 2 is a block diagram illustrating a conceptual view of a Java Bean testing tool for a computer system according to one embodiment of the present invention. Here, the Java Bean testing tool 202 reads an input file 201. This input file 201 includes the pathname to the program or Java Bean to be tested, names of other programs to be invoked by the program being tested, and the arguments to be passed to the programs to be invoked. The programs to be invoked may be part of an Application Program Interface (API). Additionally, this file 201 may contain special instructions to the testing tool. These instructions as well as the other contents of this file will be discussed in greater detail below with reference to FIG. 5.

After reading the input file, the Java Bean testing tool 202 executes the program to be tested including invoking programs listed in the input file, passing to those programs the arguments specified, and performing any special instruction such as "loop" and "sleep" included in the input file.

Finally, the Java Bean testing tool 202 generates a results log 203. This results log 203 contains information based on results of execution of the program to be tested and the programs to be invoked by the program to be tested.

Figure 3:
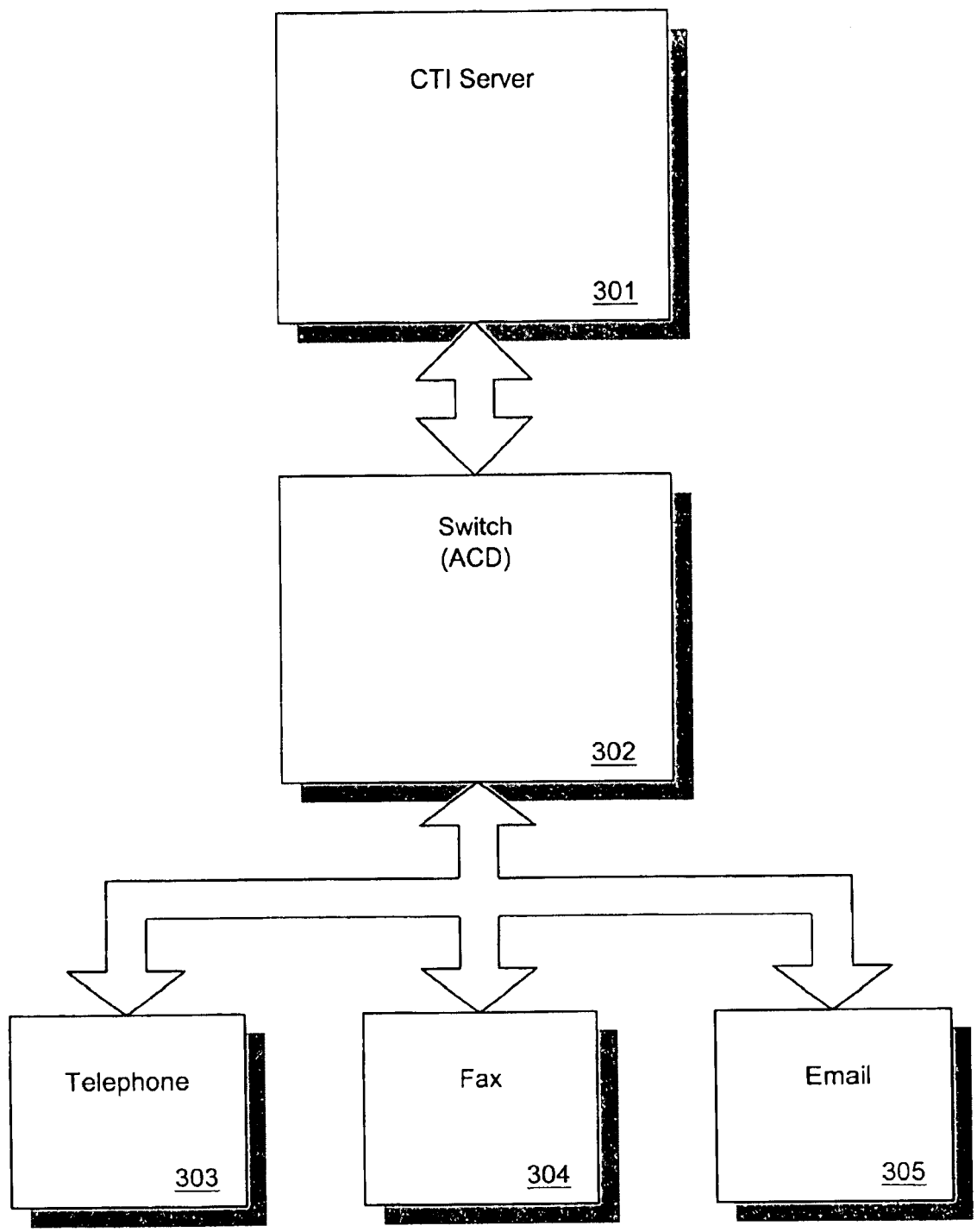
FIG. 3 is an example of a typical computer telephony integration network system upon which one embodiment of the present invention may be implemented.

Alternatively, the present invention may be implemented on a computer telephony integration (CTI) system. FIG. 3 is an example of a typical CTI system upon which one embodiment of the present invention may be implemented. In this system the Java Bean tool loads a Java Bean which communicates with a CTI server 301. Typically, this server will include many of the same features as the typical computer system described above with reference to FIG. 1. For example, the CTI server 301 will likely include a processor 102, bus 101, main memory 104, read only memory 106, mass storage devices 107, a display 121, a keyboard 122, a cursor control device 123, and a communication device 125. In the CTI server 301, the communication device 125 is likely to be a network adapter. An example of equipment that can be used as a CTI server is the Aspect Communications Office Telephony Server produced by Aspect Communications, Inc.

The CTI server 301 is connected to an Automatic Call Distributor (ACD)/switch/PBX 302. The ACD switch 302 controls and routes all the calls using call control tables. Equipment that can be used as an ACD switch includes various standard ACD switches manufactured by Aspect Communications, Inc. and others. This switch 302 is then connected to various CTI network devices such as telephones 303, fax machines 304, or email 305. An application written using a Java Bean can send telephony commands to a CTI server which interprets these commands into a proprietary language understood by the switch.

Figure 4:
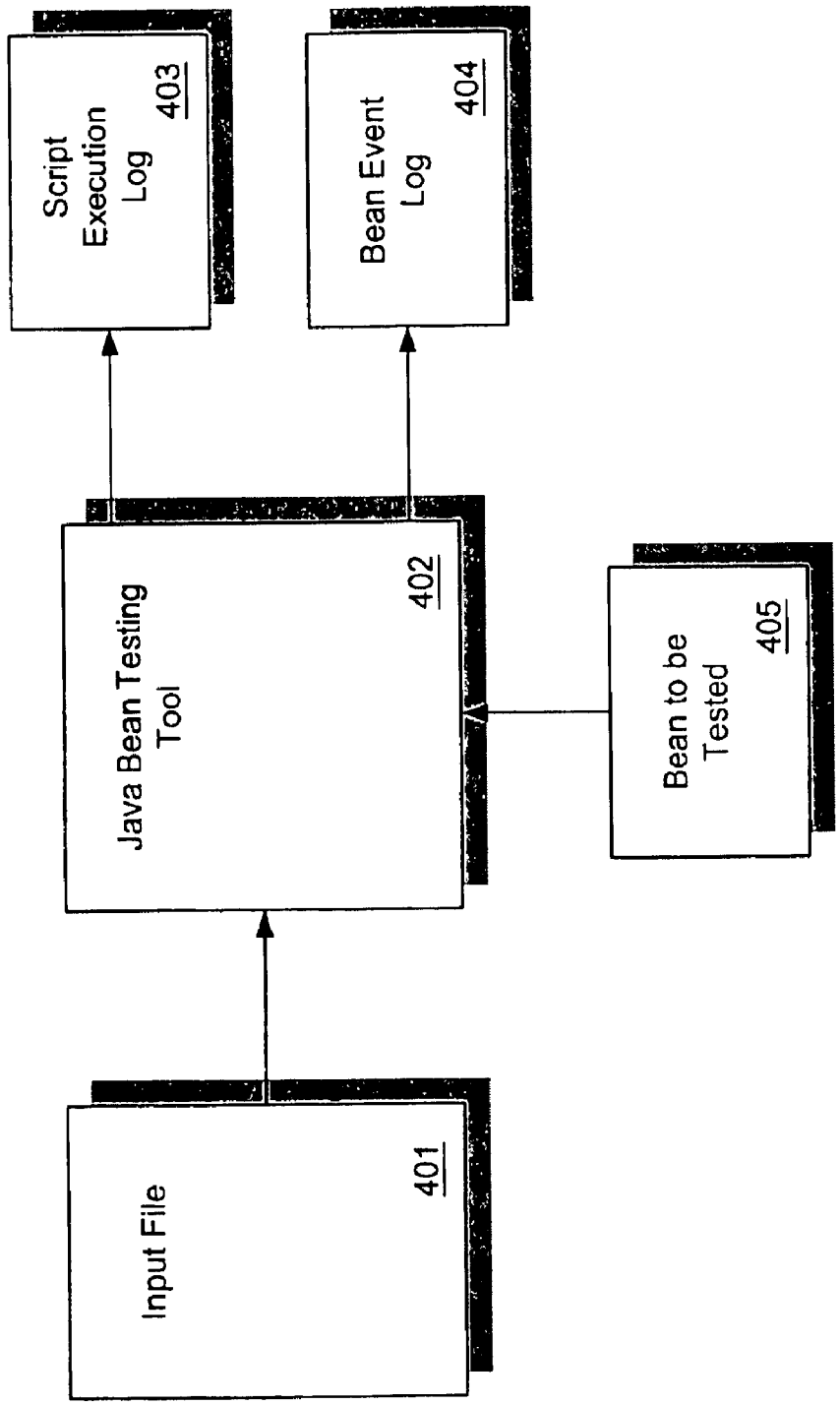
FIG. 4 is a block diagram illustrating a conceptual view of a Java Bean testing tool for a computer telephony integration server according to one embodiment of the present invention.

As explained above, the present invention may be implemented in a variety of systems. In some cases the present invention may be implemented in a CTI system such as that described with reference to FIG. 3. FIG. 4 is a block diagram illustrating a conceptual view of a Java Bean testing tool in a CTI system according to one embodiment of the present invention. Here, the Java Bean testing tool 402 reads an input file 401. This input file 401 includes the pathname to the program or Java Bean to be tested, names of other programs to be invoked by the program being tested, and arguments to be passed to the programs to be invoked. Further, this file 401 may contain special commands for the testing tool 402. These commands along with the other contents of this file will be discussed in greater detail below with reference to FIG. 5.

After reading the input file, the Java Bean testing tool 402 executes the program to be tested including invoking programs listed in the input file, passing to those programs the arguments specified, and executing any special commands contained in the input file. The programs to be invoked may be part of an Application Program Interface (API). For example, in a Microsoft Windows environment the programs to be invoked may consist of .dll type files.

Finally, the Java Bean testing tool 402 generates result logs 403 and 404. These logs can include a script execution log 403 and a bean event log 404. According to one embodiment of the present invention, when implemented on a CTI server, the script execution log 403 can contain responses from an ACD switch. In such a system the contents of the script execution log are based on the results of execution of the program to be tested and responses from an ACD switch. Similarly, when implemented on a CTI server, the bean event log 404 may contain results from one or more APIs. In such a system the bean event log 404 contains information based on results of execution of the program to be tested and the programs to be invoked by the program to be tested along with date and time stamps for each entry.

FIG. 5 is an example of an input file according to one embodiment of the present invention. In this file, comment lines 500 may be identified with a pound sign (#) as the first character of the line. This file contains the name of the program to be tested 505 and a list of programs to be invoked during execution of the program being tested and parameters to be passed to these programs 510.

Further, this file may contain special commands to the testing tool such as a loop command 515 or a sleep command 520. The loop command 515 instructs the tool to repeat all instructions between the loop command 515 and the subsequent endloop command 525. In this example, the sleep command and the MakeCall command located between the loop command 515 and the endloop command 525 are repeated 4 times. The sleep command 520 instructs the tool to pause for the specified time period in seconds. Such a command may be useful for pausing the test in order to wait for a response after invoking a program. In this example, a sleep command 520 is used to pause execution after a MakeCall command.

FIG. 6 is an example of a bean event log file according to one embodiment of the present invention. The contents of such a log are based on the results of execution of an API to be tested and any programs to be invoked by the program being tested. In this example, each entry in the log is time stamped 605 and a result 610 is recorded. These results 610 include the name of the API as well as the value returned. For example, the first entry 615 is the result of a Method1 620 instruction which returned a value of null 625.

FIG. 7 is an example of a script execution log file according to one embodiment of the present invention. When implemented in a CTI system, the contents of such a log are based on the responses from the switch corresponding to the APIs invoked. In this example, each entry in the log is time stamped 705 and a result 710 is recorded. These results 710 can indicate various responses by the ACD switch to commands issued to the switch. In this example, properties of events such as message type 715, status indicator 720, and status 725 as well as others are indicated.

Figure 8:
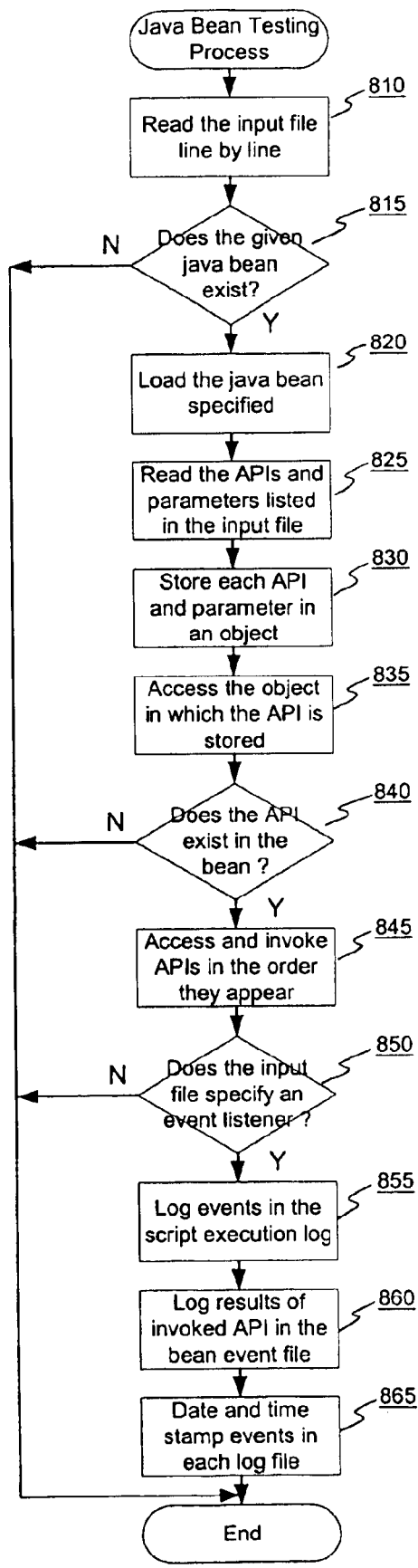
FIG. 8 is a flow chart illustrating a Java Bean testing process according to one embodiment of the present invention.

FIG. 8 is a flow chart illustrating a Java Bean testing process according to one embodiment of the present invention. First 810, the input file is read line by line. If the specified Java Bean does not exist 815, no further processing is performed. If the specified Java Bean is located 815, the bean is loaded 820. Once the specified bean has been loaded, the API names and parameters are read from the input file 825. Each API and parameter read are then stored in an object 830 and each of these objects are then accessed 835. If the APIs do not exist in the bean 840, that is, an instance of the API object has not been created, no further processing occurs. If the APIs do exist in the bean 840, they are accessed and invoked in the order in which they appear 845. If the input file does not specify an event listener 850, a script execution log is created but is left empty. If an event listener is specified 850, events are logged in the script execution log 855 and the bean event log 860 and each entry is date and time stamped 865.

According to one embodiment of the present invention, the methods described above can be implemented using an object-oriented language such as Java. In one such implementation, several classes can be created and used. These classes may include a class for handling events (an ActionEvent class), a class for adding an object (an AddObject class), a class for loading Java Beans (a JarClassLoader class), a class for running Java Beans (a JarRunner class), a class for reading an input file (a LoadJarFile class), a class for writing a log file (a Logfile class), and a class for creating a user defined object (a UserDefinedObject class). Each of these classes will be described below with reference to FIGS. 9 through 15.

Figure 9:
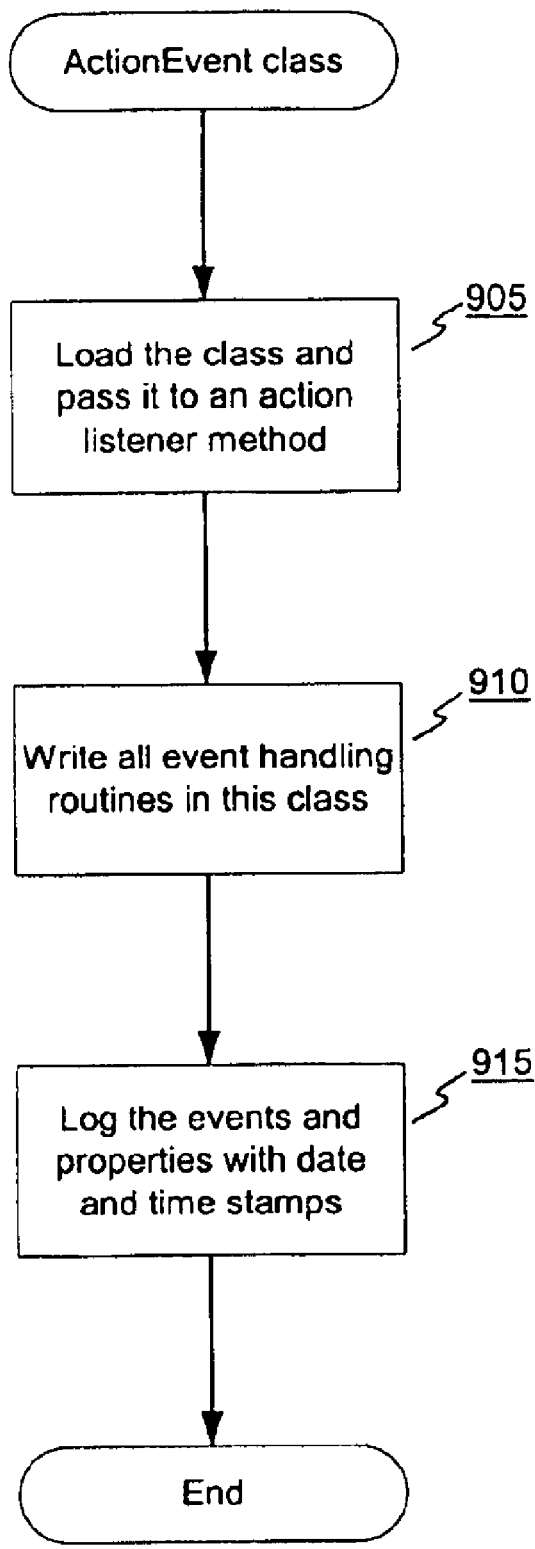
FIG. 9 is a flow chart of a class for handling events according to one embodiment of the present invention.

FIG. 9 is a flow chart of a class for handling events (an ActionEvent class) according to one embodiment of the present invention. This class first loads the specified class and passes it to an action listener method 905. Next, all event handling routines are written into the class 910. Finally, when an event occurs, the events and properties are logged with a date and time stamp 915.

Figure 10:
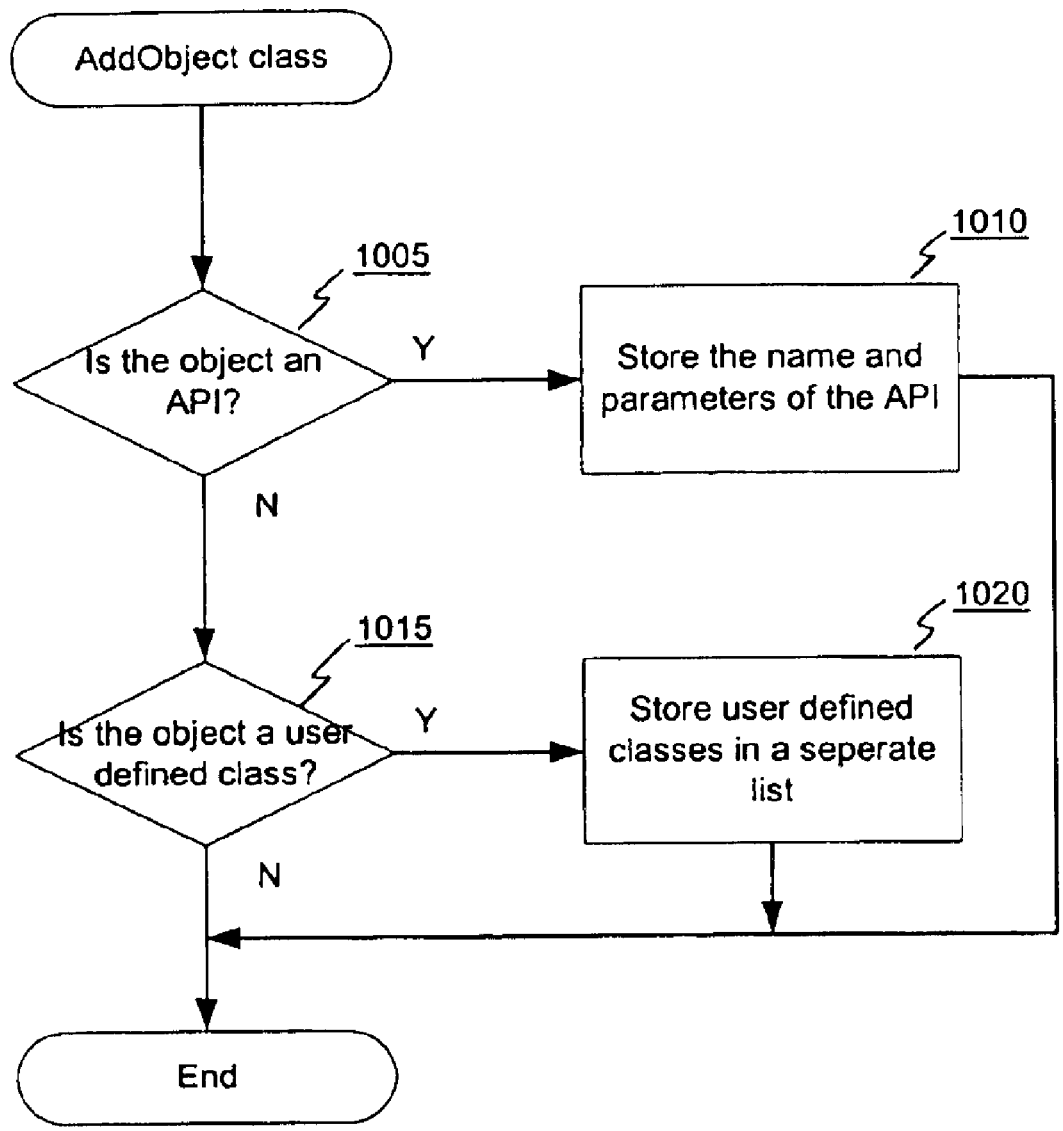
FIG. 10 is a flow chart of a class for adding an object according to one embodiment of the present invention.

FIG. 10 is a flow chart of a class for adding an object (an AddObject class) according to one embodiment of the present invention. If the object to be added is an Application Program Interface (API) 1005, this class stores the name and parameters of the API 1010. If the object to be added is a user defined class 1015, this class stores the user-defined class in a separate list 1020.

Figure 11:
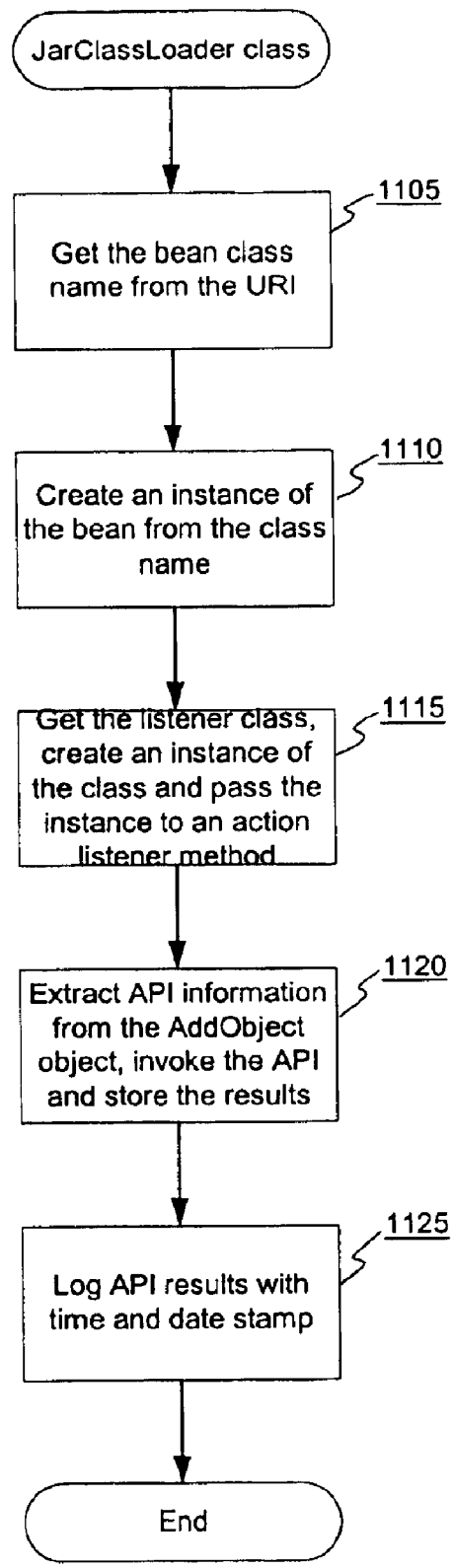
FIG. 11 is a flow chart of a class for loading Java Beans according to one embodiment of the present invention.

FIG. 11 is a flow chart of a class for loading Java Beans (a JarClassLoader class) according to one embodiment of the present invention. This class first gets the bean class name from the URI 1105. Next, this class creates an instance of the bean from the class name 1110. The listener class is then retrieved, an instance of the class is created and the instance is passed to an action listener 1115. The class then extracts API information from the add object object, invokes the API and stores the results 1120. Finally, the API results are logged with a date and time stamp 1125.

Figure 12:
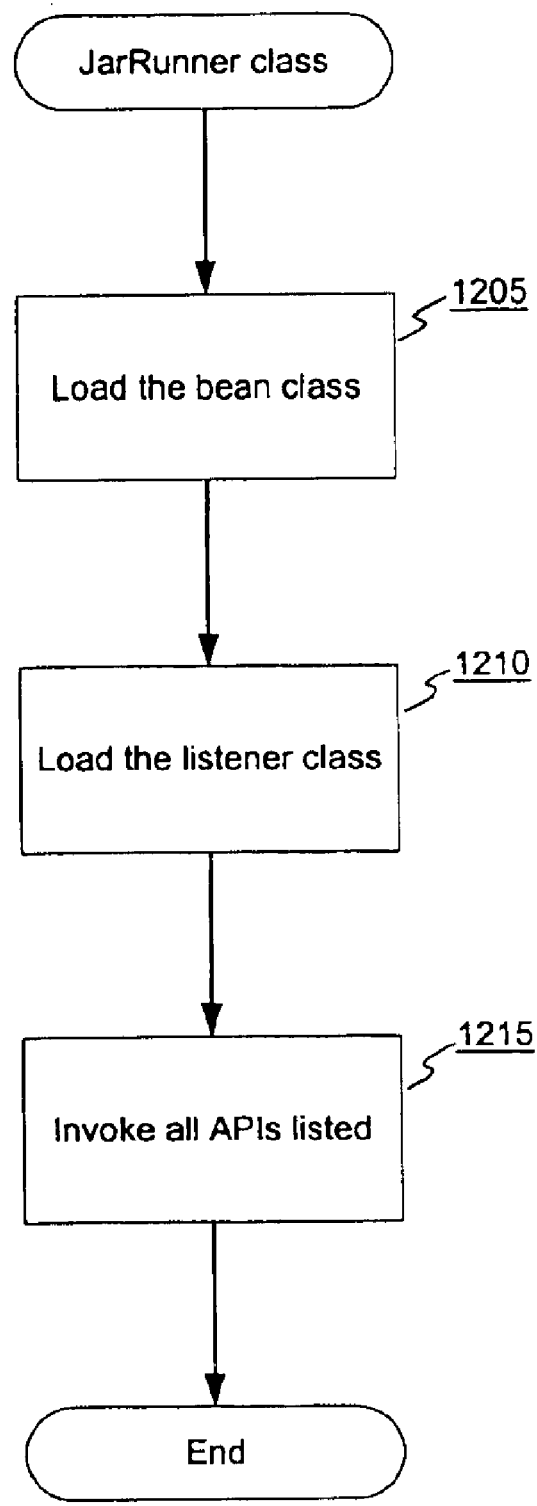
FIG. 12 is a flow chart of a class for running Java Beans according to one embodiment of the present invention.

FIG. 12 is a flow chart of a class for running Java Beans (a JarRunner class) according to one embodiment of the present invention. This class first loads the bean class 1205. Next, the listener class is loaded 1210. Finally, the class invokes all APIs listed in the input file 1215.

Figure 13:
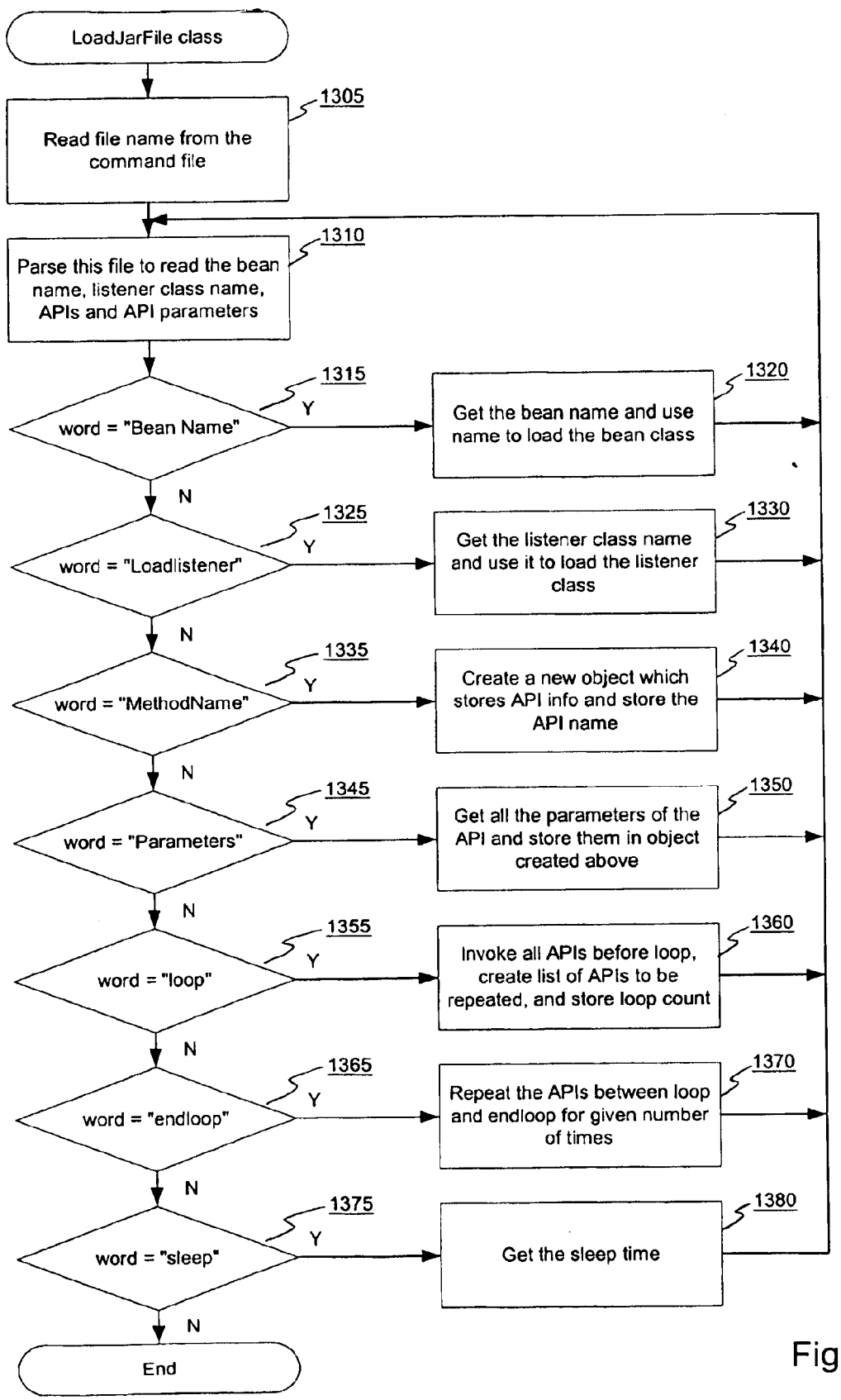
FIG. 13 is a flow chart of a class for reading an input file according to one embodiment of the present invention.

FIG. 13 is a flow chart of a class for reading an input file (a LaodJarFile class) according to one embodiment of the present invention. This class first reads a file name from the command file 1305. This file is then parsed to read the bean name, listener class name, APIs and API parameters 1310. The word read is identified as either a "BeanName" 1315, "Loadlistener" 1325, "MethodName" 1335, "Parameters" 1345, "loop" 1355, "endloop" 1365, or "sleep" 1375. If the word read does not match any of these, no processing is performed. If the word read is "BeanName" 1315, the class gets the bean name and uses the name to load the bean class 1320. When the word read is "Loadlistener" 1325, the class gets the listener class name and uses it to load the listener class 1330. If the word read is a "MethodName" 1335, the class creates a new object which stores API information and the API name 1340. When the word read is "Parameters" 1345, the class gets all the parameters of the API and stores them 1350 in an object created in step 1340.

If the word read is "loop" 1355, the class invokes all APIs before loop, creates a list of APIs to be repeated, and stores the loop count 1360. When an "endloop" is read 1365, the class repeats the APIs to be repeated between loop and endloop for the given number of times 1370. If the word read is "sleep" 1375, the class gets the sleep time 1380.

Figure 14:
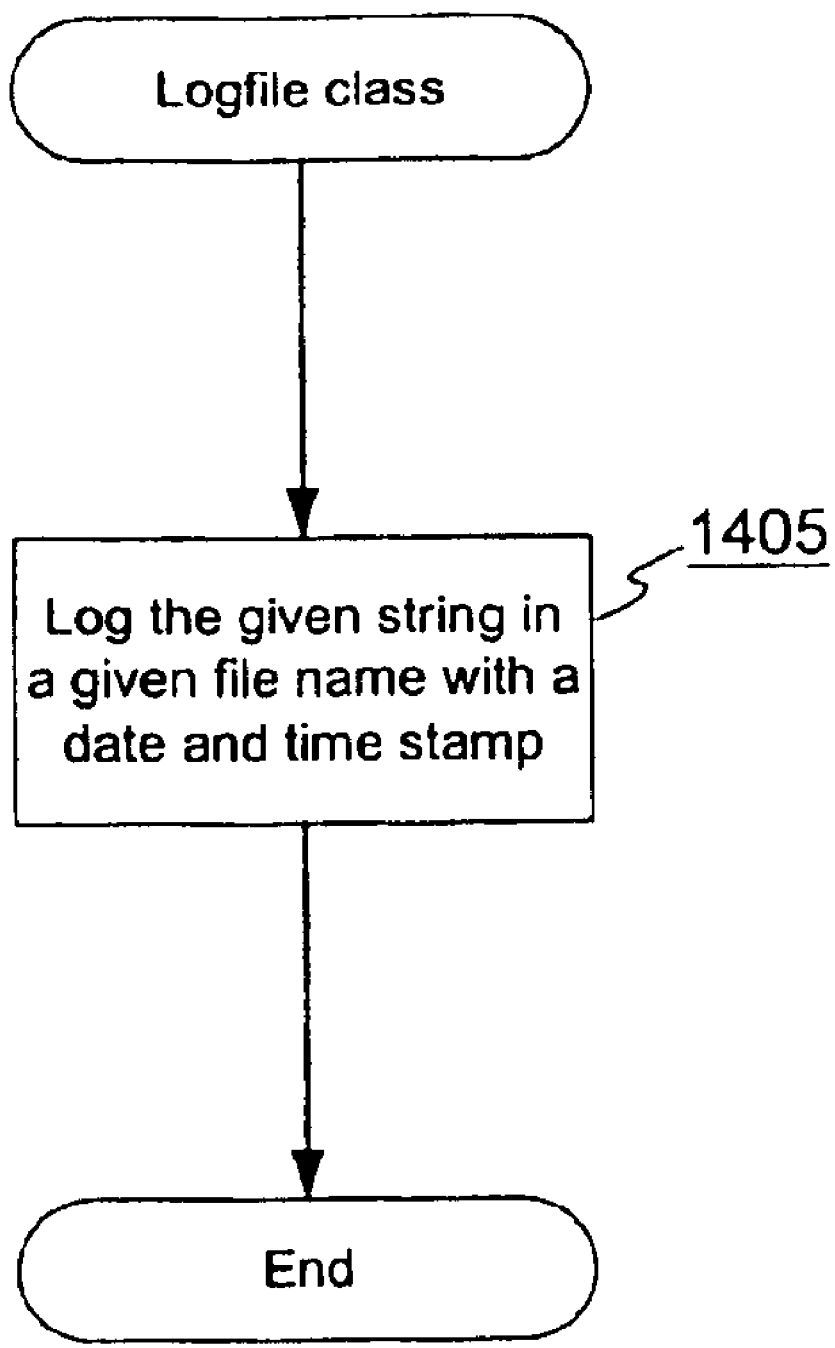
FIG. 14 is a flow chart of a class for writing a log file according to one embodiment of the present invention.

FIG. 14 is a flow chart of a class for writing a log file (a Logfile class) according to one embodiment of the present invention. This class logs the given string in a given file name with a date and time stamp 1405.

Figure 15:
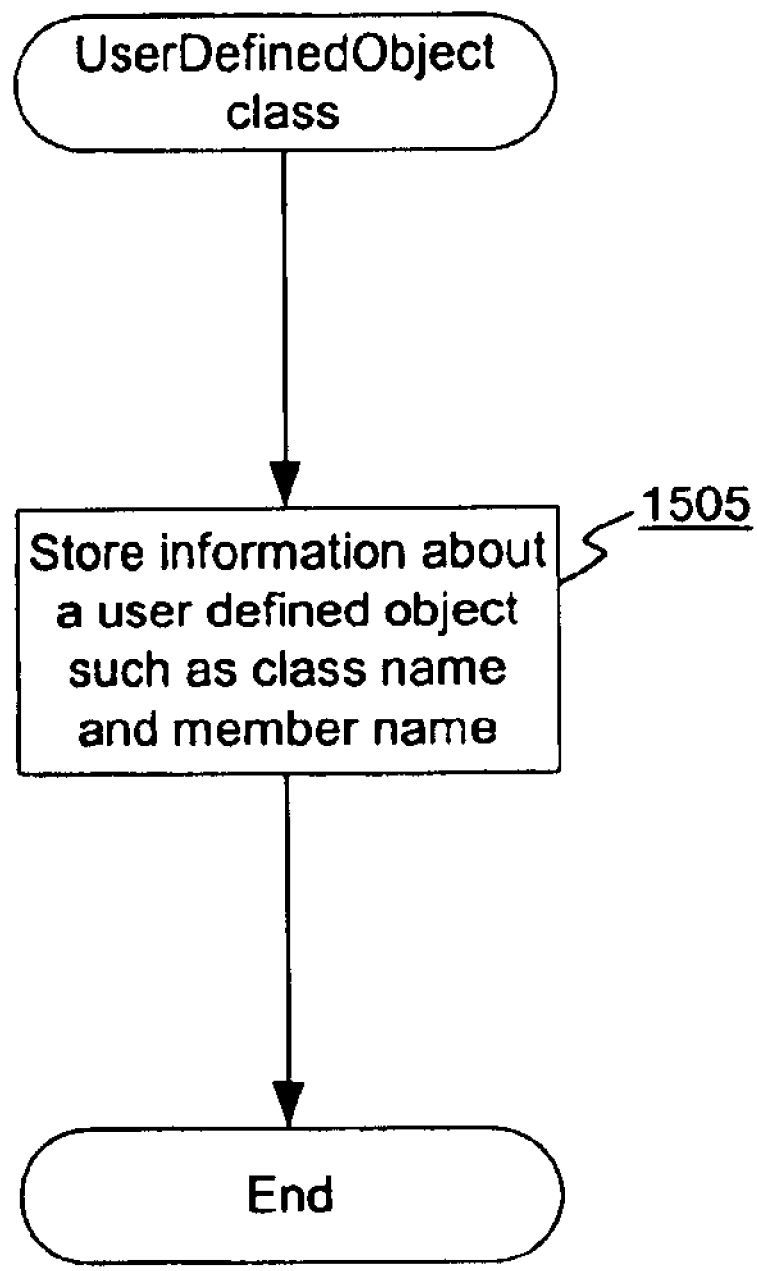
FIG. 15 is a flow chart of a class for creating a user defined object according to one embodiment of the present invention.

FIG. 15 is a flow chart illustrating a class for creating a user defined object (a UserDefinedObject class) according to one embodiment of the present invention. This class stores information about a user defined object such as class name and member name 1505.

What is claimed is:

1. A method of testing a first program, comprising:
reading an input file containing a location of a first program, identifiers of other programs to be invoked by the first program, and arguments to be passed to the other programs, wherein the input file further includes special commands having
a loop command to cause execution of the first program including repeating of instructions for a number of iterations until occurrence of an endloop instruction; and
a sleep command to cause execution of the first program to pause for a specified time;
executing the first program including invoking the other programs and passing the arguments to the other programs; and
generating one or more log files based on results of the execution of the first program.

2. The method of claim 1, wherein said input file further includes a text file.

3. The method of claim 1, wherein said first program includes a Java Bean.

4. The method of claim 1, wherein said other programs include an Application Program Interface (API).

5. The method of claim 1, wherein the executing of the first program further comprises sending commands to an Automatic Call Distributor (ACD) switch through a CTI server.

6. The method of claim 1, wherein each of said one or more log files includes a text file.

7. The method of claim 1, wherein each of said one or more log files includes a plurality of entries, each entry of the plurality of entries having a date and time stamp.

8. The method of claim 1, wherein each of said one or more log files includes contents that are based on the results of the execution of the first program and the other programs.

9. The method of claim 8, wherein the contents are further based on the results of the execution of the first program and responses from an Automatic Call Distributor (ACD) switch.

10. The method of claim 1, further comprising checking results of program testing by:
generating one or more files containing expected results of the execution of the first program and the other programs; and
comparing the one or more files containing the expected results to said one or more log files.

11. A system, comprising:
a storage device having stored therein a routine for testing a first program; and
a processor coupled to the storage device, the processor to execute the routine for testing of the first program such that execution of said routine causes the processor to:
read an input file containing a location of the first program, identifiers of other programs to be invoked by the first program, and arguments to be passed to the other programs, wherein the input file further includes special commands having
a loop command to cause execution of the first program including repeating of instructions for a number of iterations until occurrence of an endloop instruction, and
a sleep command to cause execution of the first program to pause for a specified time,
execute the first program including invoking the other programs and passing the arguments to the other programs, and
generate one or more log files based on results of the execution of the first program.

12. The system of claim 11, wherein said input file includes a text file.

13. The system of claim 11, wherein said first program includes a Java Bean.

14. The system of claim 11, wherein said other programs include an Application Program Interface (API).

15. The system of claim 11, wherein the execution of the first program further comprises making calls to an Automatic Call Distribution (ACD) switch.

16. The system of claim 11, wherein each of said one or more log files includes a text file.

17. The system of claim 11, wherein each of said on or more log files includes a plurality of entries, each of the plurality of entries including a date and time stamp.

18. The system of claim 11, wherein each of said one or more log files includes contents that are based on the results of the execution of the first program and the other programs.

19. The system of claim 18, wherein the contents are further based on the results of the execution of the first program and responses from an Automatic Call Distributor (ACD) switch.

20. The system of claim 11, further comprising instructions for checking results of program testing such that execution of the instructions causes the processor to:
generate one or more files containing expected results of the execution of the first program and the other programs; and
compare the one or more files containing the expected results to the one or more log files.

21. A machine-readable medium having stored thereon sets of instructions which, when executed by a machine, test a first program by causing the machine to:
read-an input file containing a location of the first program, identifiers of other programs to be invoked by the first program, and arguments to be passed to the other programs, wherein the input file further includes special commands having
a loop command to cause execution of the first program including repeating of instructions for a number of iterations until occurrence of an endloop instruction; and
a sleep command to cause execution of the first program to pause for a specified time;
execute the first program including invoking the other programs listed and passing the arguments to the other programs; and
generate one or more log files based on results of execution of the first program.

22. The machine-readable medium of claim 21, wherein said input file further includes a text file.

23. The machine-readable medium of claim 21, wherein said first program includes a Java Bean.

24. The machine-readable medium of claim 21, wherein said other programs include an Application Program Interface (API).

25. The machine-readable medium of claim 21, wherein the executing of the first program further comprises making calls to an Automatic Call Distributor (ACD) switch.

26. The machine-readable medium of claim 21, wherein each of said one or more log files includes a text file.

27. The machine-readable medium of claim 21, wherein each of said one or more log files includes a plurality of entries, each entry of the plurality of entries having a date and time stamp.

28. The machine-readable medium of claim 21, wherein each of said one or more log files includes contents that are based on the results of the execution of the first program and the other programs.

29. The machine-readable medium of claim 28, wherein the contents are further based on the results of the execution of the first program and responses from an Automatic Call Distributor (ACD) switch.

30. The machine-readable medium of claim 21, further comprises instructions for checking results of program testing such that execution of the instructions causes the machine to:
generate one or more files containing expected results of the execution of the first program and the other programs; and
compare the one or more files containing the expected results said one or more log files.

* * * * *